United States Patent [19]
Lin

[11] Patent Number: 6,100,614
[45] Date of Patent: Aug. 8, 2000

[54] ELECTRIC MOTOR WITH SPRING CLIP FOR STRAIN RELIEF

[75] Inventor: Chih M. Lin, Tipp City, Ohio

[73] Assignee: A. O. Smith Corporation, Milwaukee, Wis.

[21] Appl. No.: 09/228,862

[22] Filed: Jan. 12, 1999

[51] Int. Cl.[7] .......................... H02K 11/00; H01R 13/58; A44B 1/04
[52] U.S. Cl. .......................... 310/71; 439/449; 439/345; 24/115 R
[58] Field of Search .............................. 310/71; 307/145; 336/107, 192, 185, 199; 439/345, 352, 447, 449, 450, 451, 452, 456, 457, 458, 459, 460, 463, 470, 471, 472, 473; 29/605; 24/115 R, 130, 115 F

[56] References Cited

U.S. PATENT DOCUMENTS

| | | | |
|---|---|---|---|
| 3,207,837 | 9/1965 | Brezosky | 310/71 |
| 3,310,692 | 3/1967 | Rodwick | 310/71 |
| 3,457,441 | 7/1969 | Phillips et al. | 310/71 |
| 3,502,917 | 3/1970 | Bizoe | 310/71 |
| 3,772,544 | 11/1973 | Wrobel | 310/71 |
| 3,800,172 | 3/1974 | Artin et al. | 310/50 |
| 3,826,935 | 7/1974 | Grierson et al. | 310/71 |
| 4,289,923 | 9/1981 | Ebert | 174/65 G |
| 4,350,839 | 9/1982 | Lass | 174/65 G |
| 4,970,350 | 11/1990 | Harrington | 174/65 |
| 5,313,129 | 5/1994 | Stewart | 310/90 |
| 5,594,209 | 1/1997 | Nattel et al. | 174/65 |

*Primary Examiner*—Nestor Ramirez
*Assistant Examiner*—Dang Dinh Le
*Attorney, Agent, or Firm*—Michael Best & Friedrich LLP

[57] ABSTRACT

A strain relief clip for use on an electric motor including an end frame and an electrical power supply cord having an internal junction end. With the cord extending over the end frame, the clip, which includes a resilient spring tab, is mounted over the cord without feeding or inserting the cord into the clip. The clip is mounted to the end frame without the use of any other common fasteners. The cord is captured between the clip and the end frame such that the resilient spring tab engages the cord to relieve stress or strain on the internal junction end.

35 Claims, 1 Drawing Sheet

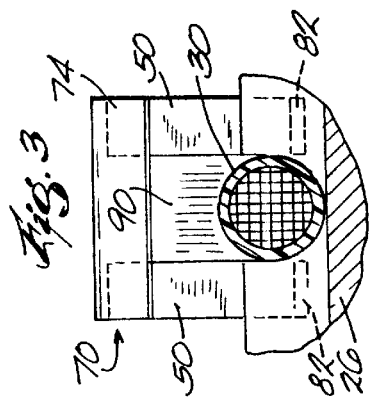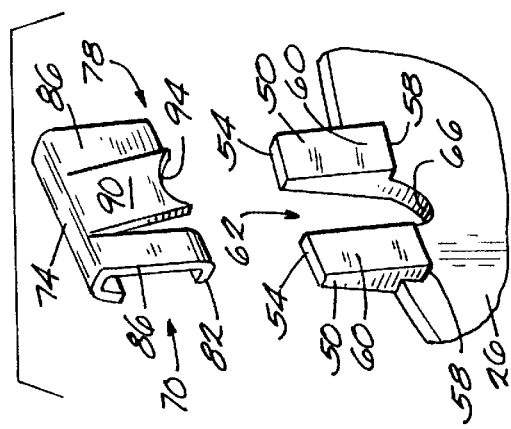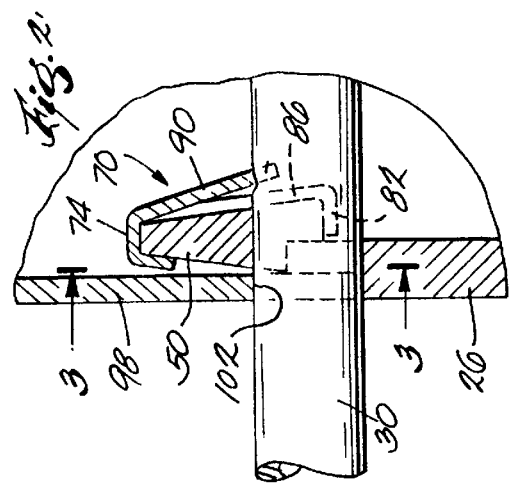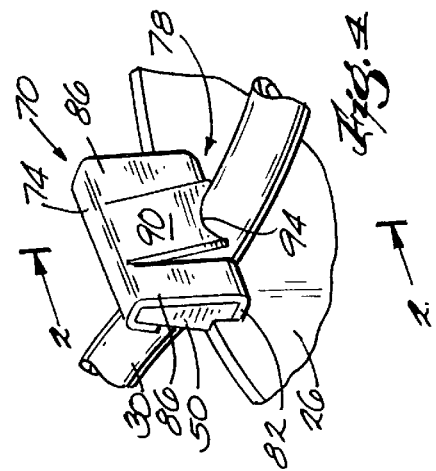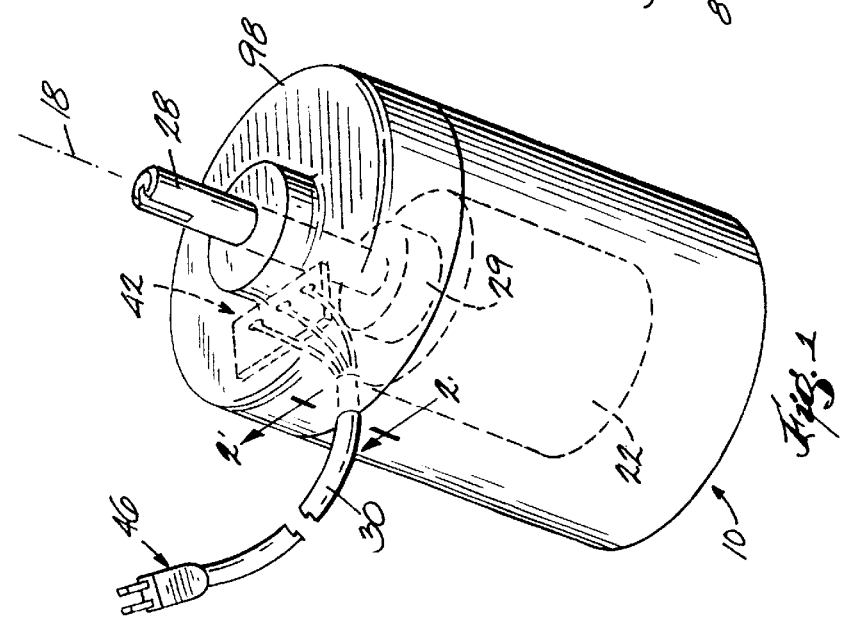

ELECTRIC MOTOR WITH SPRING CLIP FOR STRAIN RELIEF

FIELD OF THE INVENTION

The present invention relates generally to electric motors incorporating a stress or strain relief mechanism to protect the junction between the motor and the electrical power supply cord.

BACKGROUND OF THE INVENTION

Stresses and strains on the motor/electrical cord junction are a common problem due to various external forces exerted on the electrical power supply cord. If the motor falls while plugged-in or the user pulls on the cord to move the motor, stress on the junction could lead to the electrical cord pulling out of the motor, thereby breaking the junction. This may lead to a dangerous short and will require costly repairs involving disassembly of the motor.

It is known to provide mechanisms for relieving stresses and strains exerted on the motor/electrical cord junction. One conventional mechanism is a cable connector clamp that can be inserted into an opening in the motor housing. The clamp includes a cylindrical housing that defines a passage for an insulated electrical cord. Within the housing, there is a resiliently deflectable clamping element that permits insertion of the cord from the external side of the motor housing, but prevents extraction, and thereby eliminates any stress or strain at the motor/electrical cord junction due to external forces on the cord. An example of this type of clamp is disclosed in U.S. Pat. No. 4,970,350 issued Nov. 13, 1990. A variation of this clamp is disclosed in U.S. Pat. No. 5,594,209 issued Jan. 14, 1997.

It is also known to design the motor such that the housing comprises multiple components which, when assembled, work in conjunction to provide strain relief for the electrical cord passing therethrough. In one example, the housing includes a main portion which has a slot defining one half of an opening for the electrical cord. A removable portion of the housing has a slot defining another half of the opening. With the cord in place, the removable portion is inserted into the main portion and screws are used to secure the housing components together. Once the housing is secured, the electrical cord is constrained within the opening, which has a diameter that is smaller than the diameter of the cord. The edges of the opening continuously squeeze the cord and prevent movement. An example of this design is disclosed in U.S. Pat. No. 3,207,837 issued Sep. 21, 1965.

Other mechanisms incorporate conduit box covers or various other clamping devices which are typically fastened to the housing using screws.

SUMMARY OF THE INVENTION

Providing strain relief mechanisms such as common clamps and multiple component housing designs creates various problems. The main problem is the labor intensive assembly that is required. Most clamps that do not require the use of fasteners only allow the cord to be inserted from one direction. Therefore, it is necessary to feed the cord into the clamp before the cord can be connected to the motor. Other mechanisms that do not require the cord to be fed through prior to connection require the use of fasteners, making assembly of the motor difficult and time consuming. Whichever mechanism is selected, the assembly process is slowed due to the required feeding of the cord through the clamp and/or the fastening of the clamp to the housing with screws.

Another problem with some of the known methods of strain relief is the harsh over-stressing of the cord insulation. If the mechanism applies a large and constant pressure to the cord, the insulation may be damaged over time, creating the danger of a short. relief clip with a resilient spring tab. The clip is mounted on the end frame and over the cord without feeding the cord through the clip in any way and without the use of any other fasteners. The cord is captured between the clip and the end frame. The resilient spring tab engages the cord such that when a force is applied to the cord external of the end frame, that force is transmitted to the end frame and not to the internal junction end, thereby relieving stress or strain on the internal junction end.

The end frame preferably includes spaced projections defining therebetween a U-shaped recess for allowing passage of the cord. The strain relief clip is preferably configured to fit over the projections and substantially lock into place. The spring tab extends from the clip and has a curved contact surface. When the clip is mounted on the projections and over the cord, the cord deflects the tab inwardly toward the internal junction, and the contact surface engages the cord so that when the cord is pulled in a direction away from the internal junction, the contact surface digs into the cord to resist outward movement of the cord. The cord is substantially locked into place relative to the end frame, thereby relieving stress or strain on the internal junction.

The invention also provides a method of assembling an electric motor, the method comprising the steps of extending an electrical power supply cord over an end frame, making an internal junction with the cord and the motor, providing a strain relief clip having a resilient spring tab, and putting the strain relief clip over the cord and securing the clip to the end frame such that the cord is captured between the clip and the end frame.

Other features and advantages of the invention will become apparent to those skilled in the art upon review of the following detailed description, claims, and drawings. Furthermore, if the force exerted on the cord from an external source overcomes the large and constant grip of the mechanism, the insulation may be sheared and pulled back, exposing the bare wires.

Finally, some of these mechanisms are limited to use with only one gauge of cord. This means that different designs may be required for products having different cord gauges.

The present invention provides a strain relief clip that alleviates these problems. More particularly, the invention provides a strain relief clip that is mounted over the electrical power supply cord without any feeding or insertion of the cord through the clip, and without the use of any other fasteners. Rather, in the preferred embodiment the clip slides over projections on the end frame and a self-enacting locking mechanism holds the clip in place. A resilient spring tab on the clip captures the cord and functions to relieve any stress or strain on the junction. The spring clip can be added after the cord is connected to the motor since no directional insertion or feeding limitations exist. Assembly of a motor embodying the present invention is simple and cost effective.

The invention provides a clip with a resilient spring tab that maintains gentle contact and does not over-stress the insulation of the cord. The tab's locking action only occurs when the cord experiences a force that would stress the motor/electrical cord junction. Furthermore, the same resilient spring tab can be used effectively in conjunction with different gauges of cord. The present invention therefore reduces the likelihood of damage to the cord caused by constant over-stressing, and is suitable for use on more than one product line.

Specifically, the invention provides an electric motor having an end frame, an electrical power supply cord that extends over the end frame, and a strain

BRIEF DESCRIPTION OF THE DRAWINGS

FIG. 1 is a perspective view of a motor embodying the invention.

FIG. 2 is an enlarged cross sectional view taken along line 2—2 in FIGS. 1 and 4.

FIG. 3 is a view taken along line 3—3 in FIG. 2.

FIG. 4 is a partial perspective view showing the cord and the spring clip.

FIG. 5 is an exploded perspective view of the spring clip and the end frame.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter.

DESCRIPTION OF THE PREFERRED EMBODIMENT

A electric motor 10 embodying the invention is shown in the drawings. The motor 10 (see FIG. 1) comprises a housing 14 having an axis 18. The motor 10 further includes a stator 22 supported by the housing 14. An end frame 26 (see FIGS. 2–5) is mounted on the housing 14. While in the illustrated construction the end frame 26 is separate from the housing 14, in an alternative embodiment the housing 14 and the end frame 26 could be unitary.

The motor 10 further includes (see FIG. 1) a rotor shaft 28 supported by the end frame 26 for rotation about the axis 18, and a rotor 29 supported by the shaft 28 for rotation therewith relative to the stator 27.

The electric motor 10 also comprises an electrical power supply cord 30. The cord 30 typically comprises at least three wires (shown but not numbered in FIG. 1) which are surrounded by an insulating cover 38. The cord 30 is physically and electrically connected to the electric motor 10 at an internal junction end 42. The cord 30 also includes an external connection end 46 for connection to an external power supply source (not shown).

The end frame 26 (see FIG. 5) includes projections 50 which are preferably integral with the end frame 26. In the preferred embodiment, the projections 50 each have an outer end 54, an inner shoulder 58, and a radially inner ramped surface 60 extending between the outer end 54 and the shoulder 58. The projections 50, the purpose of which will be described below, are positioned in spaced relation so as to define therebetween a U-shaped recess 62. The U-shaped recess 62 preferably includes a curved seating portion 66.

The electric motor 10 also includes (see FIGS. 2–5) a strain relief clip 70. In the preferred embodiment the clip 70 is made of a suitable metal, such as steel. In alternative embodiments, the clip 70 could be made of plastic or other suitable materials. The clip 70 includes a substantially L-shaped outer portion 74 configured to fit over the outer ends 54 of the projections 50 and to span the U-shaped recess 62. The clip 70 further includes an inner portion 78 preferably having two lips 82 configured to engage respective inner shoulders 58 to substantially lock the clip 70 over the projections 50. Alternatively, the inner portion 78 need only have one lip 82.

The clip 70 also includes two intermediate portions or legs 86 that extend between the outer portion 74 and respective lips 82. Between the two intermediate portions or legs 86 is a resilient spring tab 90 that extends from the outer portion 74 toward the inner portion 78 (downward in FIGS. 2–5). The tab 90 includes a contact surface 94. In the preferred embodiment, the contact surface 94 is curved so as to provide maximum surface contact between the tab 90 and the cord 30.

In operation, the cord 30 is placed over the end frame 26 and in the U-shaped recess 62. The cord 30 is supported in the U-shaped recess 62 by the curved seating portion 66. At this point, the cord 30 may or may not be connected to the motor 10 at the junction end 42. Next, the clip 70 is mounted on the projections 50 and over the cord 30, with the tab 90 facing the junction end 42. No fasteners are needed as the clip 70 is self-locking. The lips 82 engage the ramped surfaces 60 and are deflected radially inward (relative to the axis 18) as the lips 82 approach the inner shoulders 58. Upon reaching the inner shoulders 58, the lips 82 snap into place over the inner shoulders 58, substantially locking the clip 70 to the projections 50. The outer portion 74 fits over the outer ends 54 of the projections 50 and spans the U-shaped recess 62. With the clip 70 substantially locked into place over the projections 50, the cord 30 is captured between the tab 90 and the end frame 26.

The clip 70 is mounted over the cord 30 without requiring any feeding or inserting of the cord 30 through the clip 70. As the clip 70 is mounted over the cord 30, the tab 90 deflects angularly toward the junction end 42. The amount of deflection is determined by the gauge of the cord 30, which may vary. Most of the time, the contact surface 94 gently engages the cord 30, avoiding any constant or excessive stress on the insulating cover 38 or the wires 34. If and when the cord 30 is pulled from the external connection end 46, however, the contact surface 94 digs into the insulating cover 38 and resists outward movement of the cord 30.

By resisting outward movement of the cord 30, the tab 90 substantially locks the cord 30 in place relative to the end frame 26. The force (not shown) acting on the cord 30, which would normally create stress at the junction end 42, is transmitted through the tab 90 and the clip 70 to the end frame 26. By transmitting the force to the end frame 26, the clip 70 relieves any stress or strain that would otherwise exist at the junction end 42 and prevents the potential severance of the junction end 42 from the motor 10. The tab 90 does, however, allow movement of the cord 30 toward the junction end 42 to facilitate connection with the motor 10, if not yet completed.

With the clip 70 in place and the junction end 42 connected to the motor 10, an end cover 98 can be mounted on the end frame 26. The end cover 98 includes a notch 102. The end cover 98 is placed on the end frame 26 such that the notch 102 lines up with the clip 70 and the cord 30. The end cover 98 allows the cord 30 to pass therethrough while protecting the inner workings of the motor 10 from the outside environment.

The clip 70 can be removed by deflecting the legs 86 until the lips 82 clear the shoulders 58.

Various features of the invention are set forth in the following claims.

What is claimed is:

1. An electric motor comprising:
   an end frame having spaced projections;
   an electrical power supply cord having an internal junction end and extending over said end frame; and
   a strain relief clip mounted over said cord and fixed to said end frame on said projections without inserting or feeding said cord into said clip and without the use of other fasteners for securing said clip in place, said clip having a resilient spring tab engaging said cord such that a force applied to said cord external of said end frame is transmitted to said end frame and not to said internal junction end, thereby relieving stress or strain on said internal junction end.

2. An electric motor according to claim 1, wherein said spaced projections define therebetween a U-shaped recess for passage of said cord.

3. An electric motor according to claim 2, wherein each of said projections includes an outer end and an inner shoulder, and wherein said strain relief clip further includes
   an outer portion configured to fit over said outer ends and span said U-shaped recess, and
   an inner portion having at least one lip configured to engage said inner shoulders to substantially lock said clip to said projections.

4. An electric motor according to claim 3, wherein said inner portion has two lips configured to engage respective ones of said inner shoulders to substantially lock said clip to said projections.

5. An electric motor according to claim 4, wherein said resilient spring tab extends from said outer portion and includes a contact surface such that when said clip is mounted on said projections and over said cord, said cord angularly deflects said tab toward said internal junction end, and said contact surface engages said cord so that when said cord is pulled in a direction away from said internal junction end, said contact surface digs into said cord to resist outward movement of said cord and substantially locks said cord in place relative to said end frame, thereby relieving stress or strain on said internal junction end.

6. An electric motor according to claim 5, wherein said contact surface is curved to provide maximum surface contact with said cord.

7. An electric motor according to claim 4, wherein said clip further includes two intermediate portions extending between said outer portion and respective ones of said lips and on opposite sides of said tab.

8. An electric motor according to claim 4, wherein each of said projections further includes a radially inner ramped surface extending between said outer end and said inner shoulder, such that when said clip is mounted on said projections, said inner portion is deflected radially inward as it approaches said inner shoulder until said lips snap into place, engaging said inner shoulder.

9. An electric motor according to claim 4, wherein said outer portion is substantially L-shaped.

10. An electric motor according to claim 1, further comprising an end cover which is mounted over said end frame and which has a notch for accepting said cord.

11. An electric motor according to claim 1, further comprising a stator fixed relative to said end frame, a rotor shaft supported by said end frame for rotation about an axis, and a rotor supported by said shaft for rotation therewith relative to said stator.

12. An electric motor according to claim 11, further comprising a housing, wherein said end frame is mounted on said housing and wherein said stator is supported by said housing.

13. An electric motor comprising:
    an end frame;
    a stator fixed relative to said end frame;
    a rotor shaft supported by said end frame for rotation about an axis;
    a rotor supported by said shaft for rotation therewith relative to said stator;
    an electrical power supply cord having an internal junction end and extending over said end frame;
    a strain relief clip mounted on said end frame such that said cord is captured between said clip and said end frame, said clip having a resilient spring tab engaging said cord such that a force applied to said cord external of said end frame is transmitted to said end frame and not to said internal junction end, thereby relieving stress or strain on said internal junction end; and
    an end cover which is mounted over said end frame and which has a notch for accepting said cord and which also covers said strain relief clip.

14. An electric motor according to claim 13, wherein said end frame includes spaced projections defining therebetween a U-shaped recess for passage of said cord, and wherein said clip is mounted on said projections.

15. An electric motor comprising:
    an end frame including spaced projections defining therebetween a U-shaped recess, wherein each of said projections includes an outer end and an inner shoulder;
    an electrical power supply cord having an internal junction end and extending over said end frame and through said recess; and
    a strain relief clip mounted on said projections such that said cord is captured between said clip and said end frame, said clip having a resilient spring tab engaging said cord such that a force applied to said cord external of said end frame is transmitted to said end frame and not to said internal junction end, thereby relieving stress or strain on said internal junction end;
    and wherein said strain relief clip further includes
    an outer portion configured to fit over said outer ends and span said U-shaped recess, and
    an inner portion having at least one lip configured to engage said inner shoulders to substantially lock said clip to said projections.

16. An electric motor according to claim 15, wherein said inner portion has two lips configured to engage respective ones of said inner shoulders to substantially lock said clip to said projections.

17. An electric motor according to claim 16, wherein said resilient spring tab extends from said outer portion and includes a contact surface such that when said clip is mounted on said projections and over said cord, said cord angularly deflects said tab toward said internal junction end, and said contact surface engages said cord so that when said cord is pulled in a direction away from said internal junction end, said contact surface digs into said cord to resist outward movement of said cord and substantially locks said cord in place relative to said end frame, thereby relieving stress or strain on said internal junction end.

18. An electric motor according to claim 17, wherein said contact surface is curved to provide maximum surface contact with said cord.

19. An electric motor according to claim 16, wherein said clip further includes two intermediate portions extending between said outer portion and respective ones of said lips and on opposite sides of said tab.

20. An electric motor according to claim 16, wherein each of said projections further includes a radially inner ramped surface extending between said outer end and said inner shoulder, such that when said clip is mounted on said projections, said inner portion is deflected radially inward as it approaches said inner shoulder until said lips snap into place, engaging said inner shoulder.

21. An electric motor according to claim 16, wherein said outer portion is substantially L-shaped.

22. An electric motor according to claim 15, further comprising an end cover which is mounted over said end frame and which has a notch for accepting said cord.

23. An electric motor according to claim 15, further comprising a stator fixed relative to said end frame, a rotor shaft supported by said end frame for rotation about an axis, and a rotor supported by said shaft for rotation therewith relative to said stator.

24. An electric motor according to claim 23, further comprising a housing, wherein said end frame is mounted on said housing and wherein said stator is supported by said housing.

25. An electric motor comprising:

a housing having an axis;

an end frame mounted on said housing, said end frame including spaced projections, each having an outer end, an inner shoulder and a radially inner ramped surface extending between said outer end and said inner shoulder, said projections defining therebetween a U-shaped recess;

a stator supported by said housing and fixed relative to said end frame;

rotor shaft supported by said end frame for rotation about said axis;

a rotor supported by said shaft for rotation therewith relative to said stator;

an electrical power supply cord having an internal junction end and extending through said recess in said end frame for connection with an external power supply;

a strain relief clip mounted on said projections and over said cord without inserting or feeding said cord into said clip and without the use of fasteners such that said cord is captured between said clip and said end frame, said clip including
    an outer portion configured to fit over said outer ends and span said U-shaped recess,
    an inner portion having two lips configured to engage respective ones of said inner shoulders to substantially lock said clip to said projections,
    a resilient spring tab extending from said outer portion and including a contact surface such that when said clip is mounted on said projections and over said cord, said cord angularly deflects said tab toward said internal junction end, and said contact surface engages said cord so that when said cord is pulled in a direction away from said internal junction end, said contact surface digs into said cord to resist outward movement of said cord and substantially locks said cord in place relative to said end frame, transmitting force to said end frame and not to said internal junction end and thereby relieving stress or strain on said internal junction end, and
    two intermediate portions extending between said outer portion and respective ones of said lips and on opposite sides of said tab; and an end cover which is mounted over said end frame and which has a notch for accepting said cord.

26. An electric motor comprising:

an end frame having spaced projections defining therebetween a U-shaped recess, wherein each of said projections includes an outer end and an inner shoulder;

an electric power supply cord having an internal junction end and extending through said U-shaped recess; and a strain relief clip mounted over said cord and mounted on said projections, said clip including an outer portion configured to fit over said outer ends of said projections and span said U-shaped recess, and an inner portion having at least one lip configured to engage said inner shoulders of said projections to substantially lock said clip to said projections, said clip having a portion which engages said cord such that a force applied to said cord external of said end frame is transmitted to said end frame and not to said internal junction end, thereby relieving stress or strain on said internal junction end.

27. An electric motor according to claim 26, wherein said clip portion comprises a resilient spring tab.

28. An electric motor according to claim 26, wherein said inner portion has two lips configured to engage respective ones of said inner shoulders to substantially lock said clip to said projections.

29. An electric motor according to claim 28, wherein said clip portion extends from said outer portion and includes a contact surface such that when said clip is mounted on said projections and over said cord, said cord angularly deflects said clip portion toward said internal junction end, and said contact surface engages said cord so that when said cord is pulled in a direction away from said internal junction end, said contact surface digs into said cord to resist outward movement of said cord and substantially locks said cord in place relative to said end frame, thereby relieving stress or strain on said internal junction end.

30. An electric motor according to claim 29, wherein said contact surface is curved to provide maximum surface contact with said cord.

31. An electric motor according to claim 28, wherein said clip further includes two intermediate portions extending between said outer portion and respective ones of said lips and on opposite sides of said clip portion.

32. An electric motor according to claim 28, wherein each of said projections further includes a radially inner ramped surface extending between said outer end and said inner shoulder, such that when said clip is mounted on said projections, said inner portion is deflected radially inward as it approaches said inner shoulder until said lips snap into place, engaging said inner shoulder.

33. An electric motor according to claim 28, wherein said outer portion is substantially L-shaped.

34. An electric motor according to claim 26, wherein said strain relief clip is mounted over said cord and mounted on said projections without inserting or feeding said cord into said clip and without the use of other fasteners.

35. An electric motor according to claim 26, wherein said strain relief clip is mounted on said end frame such that said cord is captured between said clip and said end frame.

* * * * *

UNITED STATES PATENT AND TRADEMARK OFFICE
CERTIFICATE OF CORRECTION

PATENT NO.    : 6,100,614
DATED         : August 8, 2000
INVENTOR(S)   : Chih M. Lin It is certified that error appears in the above-identified patent and that said Letters Patent is hereby corrected as shown below:

<u>Column 2,</u>
Line 5, after "short." insert -- Furthermore, if the force exerted on the cord from an external source overcomes the large and constant grip of the mechanism, the insulation may be sheared and pulled back, exposing the bare wires.
      Finally, some of these mechanisms are limited to use with only one gauge of cord. This means that different designs may be required for products having different cord gauges.
      The present invention provides a strain relief clip that alleviates these problems. More particularly, the invention provides a strain relief clip that is mounted over the electrical power supply cord without any feeding or insertion of the cord through the clip, and without the use of any othe fasteners. Rather, in the preferred embodiment the clip slides over projections on the end frame and a self-enacting locking mechanism holds the clip in place. A resilient spring tab on the clip captures the cord and functions to relieve any stress or strain on the junction. The spring clip can be added after the cord is connected to the motor since no directional insertion or feeding limitations exist. Assembly of a motor embodying the present invention is simple and cost effective.
      The invention provides a clip with a resilient spring tab that maintains gentle contact and does not over-stress the insulation of the cord. The tab's locking action only occurs when the cord experiences a force that would stress the motor/electrical cord junction. Furthermore, the same resilient spring tab can be used effectively in conjunction with different gauges of cord. The present invention therefore reduces the likelihood of damage to the cord caused by constant over-stressing, and is suitable for use on more than one product line.
      Specifically, the invention provides an electric motor having an end frame, an electrical power supply cord that extends over the end frame, and a strain --.

UNITED STATES PATENT AND TRADEMARK OFFICE
CERTIFICATE OF CORRECTION

PATENT NO.   : 6,100,614
DATED        : August 8, 2000
INVENTOR(S)  : Chih M. Lin It is certified that error appears in the above-identified patent and that said Letters Patent is hereby corrected as shown below:

<u>Column 2 through Column 3,</u>
Delete line 38 through line 5.

Signed and Sealed this

Eighteenth Day of June, 2002

*Attest:*

*Attesting Officer*

JAMES E. ROGAN
*Director of the United States Patent and Trademark Office*